US012227388B2

(12) United States Patent
Ishiguro

(10) Patent No.: US 12,227,388 B2
(45) Date of Patent: Feb. 18, 2025

(54) ELEVATOR WHICH PERFORMS A RELEVELING OPERATION BASED ON A CAR HEIGHT

(71) Applicant: Mitsubishi Electric Corporation, Tokyo (JP)

(72) Inventor: Hidetaka Ishiguro, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 565 days.

(21) Appl. No.: 16/611,228

(22) PCT Filed: Jun. 22, 2017

(86) PCT No.: PCT/JP2017/023088
§ 371 (c)(1),
(2) Date: Nov. 6, 2019

(87) PCT Pub. No.: WO2018/235245
PCT Pub. Date: Dec. 27, 2018

(65) Prior Publication Data
US 2020/0156902 A1 May 21, 2020

(51) Int. Cl.
*B66B 1/40* (2006.01)

(52) U.S. Cl.
CPC .................................... *B66B 1/40* (2013.01)

(58) Field of Classification Search
CPC .... B66B 1/36; B66B 1/40; B66B 1/42; B66B 1/44; B66B 1/28–34; B66B 5/0018–0037; B66B 7/10
See application file for complete search history.

(56) References Cited

U.S. PATENT DOCUMENTS 3,670,851 A * 6/1972 Shima .................... B66B 1/285 187/295
3,785,463 A * 1/1974 Kuhl ...................... B66B 1/285 187/295
3,891,064 A * 6/1975 Clark ..................... B66B 1/285 187/295
(Continued)

FOREIGN PATENT DOCUMENTS

JP 62-211277 A 9/1987
JP 4-55273 A 2/1992
(Continued)

OTHER PUBLICATIONS

International Search Report and Written Opinion mailed on Sep. 26, 2017 for PCT/JP2017/023088 filed on Jun. 22, 2017, 14 pages including English Translation of the International Search Report and Written Opinion.

*Primary Examiner* — Christopher Uhlir
(74) *Attorney, Agent, or Firm* — XSENSUS LLP

(57) ABSTRACT

An elevator apparatus which includes a car; a hoisting rope having an expansion and contraction amount which varies depending on a height of the car; and a counterweight which on an opposite side of the car via the hoisting rope. The hoisting rope is wound around a hoisting machine, and the car is elevated when the hoisting rope is wound by the hoisting machine. In a control device of the elevator apparatus, a speed-command corrector corrects a base speed command, which is generated by a re-leveling operation controller, based on a current height of the car.

8 Claims, 4 Drawing Sheets

(56) References Cited

U.S. PATENT DOCUMENTS

| | | | | |
|---|---|---|---|---|
| 5,677,519 | A * | 10/1997 | Herkel | B66B 1/3492 187/394 |
| 5,828,014 | A * | 10/1998 | Goto | F16F 15/02 187/292 |
| 6,089,355 | A | 7/2000 | Seki et al. | |
| 10,252,879 | B2 * | 4/2019 | Lotfi | B66B 1/40 |

FOREIGN PATENT DOCUMENTS

| | | | |
|---|---|---|---|
| JP | 5-92877 | A | 4/1993 |
| JP | 11-79573 | A | 3/1999 |
| JP | 2004-123256 | A | 4/2004 |
| JP | 2012-246113 | A | 12/2012 |

* cited by examiner

ELEVATOR WHICH PERFORMS A RELEVELING OPERATION BASED ON A CAR HEIGHT

CROSS-REFERENCE TO RELATED APPLICATION

The present application is based on PCT filing PCT/JP2017/023088, filed Jun. 22, 2017, the entire contents of which are incorporated herein by reference.

TECHNICAL FIELD

The present invention relates to an elevator apparatus, in particular, an elevator apparatus configured to perform a floor re-leveling operation (re-leveling operation) when a car is beyond a landing error tolerance.

BACKGROUND ART

In Patent Literature 1, there is described an elevator apparatus configured to perform a floor re-leveling operation (re-leveling operation) when a car is beyond a landing error tolerance. In the elevator apparatus, in order to take in consideration the expansion and contraction of a hoisting rope caused by an applied load in the car, a speed command for an elevator landing zone is corrected based on the load in the car. More specifically, when the applied load in the car is heavier than a reference value, a landing speed command is corrected so as to increase the speed of the car. In contrast, when the applied load in the car is lighter than the reference value, the landing speed command is corrected so as to reduce the speed of the car.

CITATION LIST

Patent Literature

[PTL 1] JP 5-92877 A

SUMMARY OF INVENTION

Technical Problem

However, in an actual elevator apparatus, the expansion and contraction of the hoisting rope are caused not only by the applied load in the car but also by acceleration and deceleration of the car at the time of the re-leveling operation. The expansion and contraction amount of the hoisting rope varies depending on a height of a stop position of the car. In particular, in an ultra-high lift elevator apparatus having an elevating stroke exceeding 300 m, even when vibrations of the car do not occur at the time of the re-leveling operation at an upper floor, large vibrations may occur due to expansion and contraction of the hoisting rope at the time of the acceleration and deceleration of the re-leveling operation at a lower floor, with the result that there arises a problem in that ride comfort at the time of the re-leveling operation is deteriorated.

The present invention has been made to solve such a problem, and has an object to provide an elevator apparatus capable of suppressing an occurrence of the vibrations of the car at the time of the re-leveling operation.

Solution to Problem

In order to solve the above-mentioned problem, in an elevator apparatus according to one embodiment of the present invention, a speed at a time of a re-leveling operation is corrected based on a current height of a car.

Advantageous Effects of Invention

According to the elevator apparatus of the present invention, an occurrence of the vibrations of the car at the time of the re-leveling operation can be suppressed.

DESCRIPTION OF EMBODIMENTS

Now, detailed description is made of embodiments of the present invention. However, the embodiments described below are examples, and the present invention is not limited to these embodiments.

First Embodiment

Figure 1:
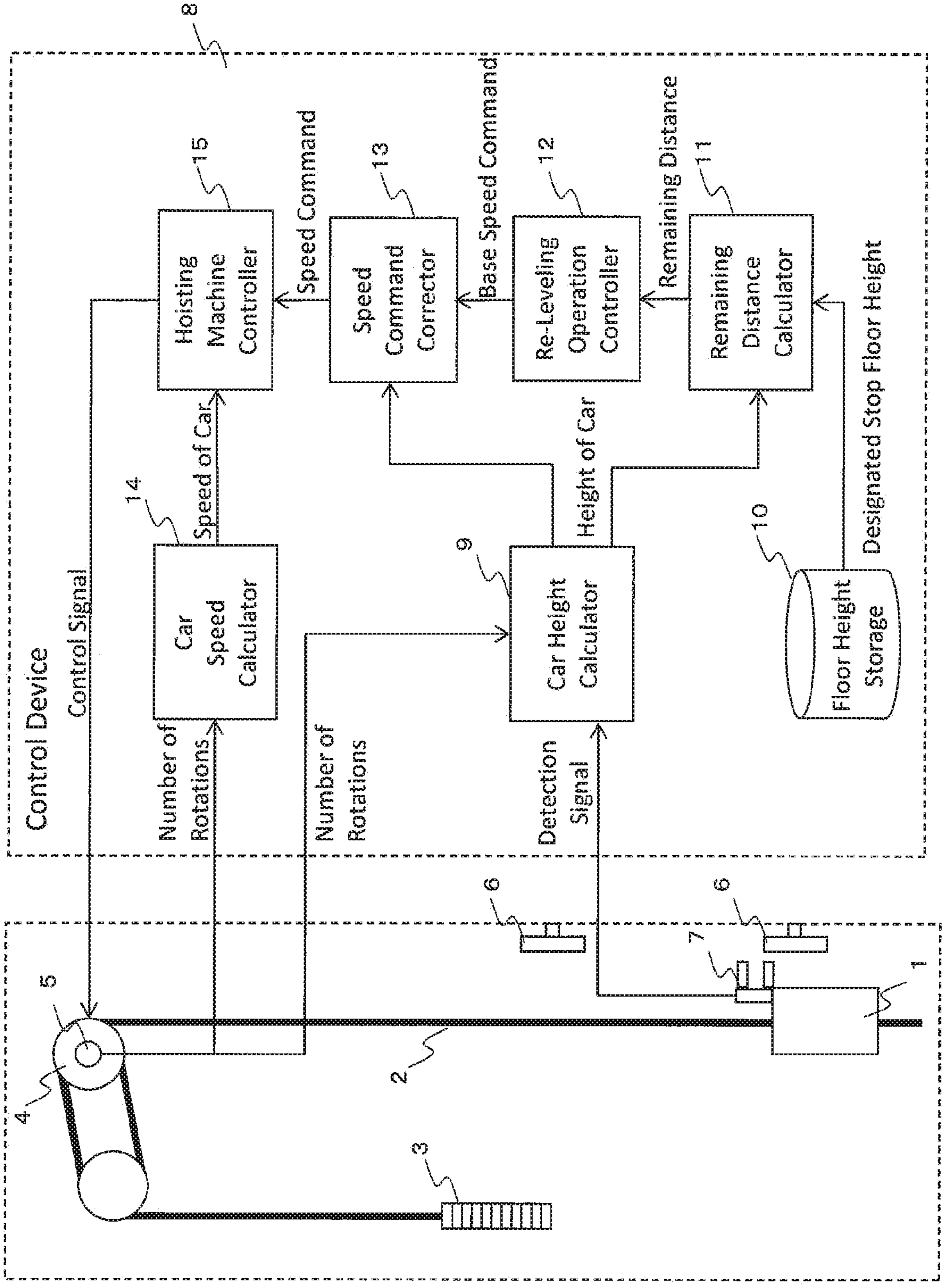
FIG. 1 is a diagram for illustrating an overall configuration of an elevator apparatus according to a first embodiment of the present invention.

FIG. 1 is a diagram for illustrating an overall configuration of an elevator apparatus according to a first embodiment of the present invention.

The elevator apparatus comprises a car 1, a hoisting rope 2, and a counterweight 3. The car 1 is configured to allow a passenger to ride thereon. The hoisting rope 2 has an expansion and contraction amount which varies depending on a height of the car 1. The counterweight 3 is provided on an opposite side of the car 1 via the hoisting rope 2. The hoisting rope 2 is wound around a hoisting machine 4, and the car 1 is elevated when the hoisting rope 2 is wound by the hoisting machine 4.

A rotation detection device 5, which detects the number of rotations of the hoisting machine 4, is mounted to the hoisting machine 4. The rotation detection device 5 outputs the number of rotations of the hoisting machine 4 in a pulse signal form. Alternatively, the rotation detection device 5 may be mounted to a sheave portion of a speed governor (not shown) connected via a speed governor rope (not shown).

Inside a hoistway of the elevator apparatus, plates 6 are provided at positions corresponding to floors. A plurality of plates 6 may be provided, for example, in a zone for allowing opening and closing of a door and in a zone for allowing the re-leveling operation on each floor.

A plate detector 7, which detects the plate 6, is provided to the car 1. When the plate detector 7 itself is at the same height as a plate 6, the plate detector 7 detects the plate 6 and outputs a detection signal. When a plurality of plates 6 are provided, for example, in the zone for allowing opening and closing of a door and in the zone for allowing the re-leveling operation, a plurality of corresponding plate detectors 7 are provided to the car 1.

A control device 8 of the elevator apparatus comprises a car-height calculator 9, a floor-height storage 10, a remaining-distance calculator 11, a re-leveling operation controller 12, a speed-command corrector 13, a car-speed calculator 14, and a hoisting-machine controller 15. It is not always required that those units in the control device 8 be provided as separate units, and the units may be formed as individual processes performed by the same microcomputer.

The car-height calculator 9 calculates a movement amount of the car 1 based on the number of rotations of the hoisting machine 4 output from the rotation detection device 5, and calculates a current height of the car 1 based on the movement amount and the detection signal of the plates 6 output from the plate detector 7.

Respective heights of each floor are stored in the floor-height storage 10. For example, the car 1 is previously moved from the bottom floor to the top floor, and the respective heights of each floor are stored as respective heights of the car 1 calculated by the car-height calculator 9 at each floor.

The remaining-distance calculator 11 calculates a remaining distance to a designated stop position of the car 1 based on a designated stop floor of the car 1 obtained from an operation management section (not shown) which manages operation information of the elevator apparatus, a height of a designated stop floor stored in the floor-height storage 10, and a current height of the car 1 calculated by the car-height calculator 9.

The re-leveling operation controller 12 generates a base speed command for the re-leveling operation of the car 1 based on the remaining distance calculated by the remaining-distance calculator 11.

The speed-command corrector 13 corrects the base speed command, which is generated by the re-leveling operation controller 12, based on the current height of the car 1 calculated by the car-height calculator 9, and generates a final speed command.

The car-speed calculator 14 calculates the current speed of the car 1 based on the number of rotations of the hoisting machine 4 detected by the rotation detection device 5.

The hoisting-machine controller 15 performs feedback control based on the speed command output from the speed-command corrector 13 and the current speed of the car 1 calculated by the car-speed calculator 14, and controls the number of rotations of the hoisting machine 4, i.e. the speed of the car 1. Further, although not illustrated, the hoisting-machine controller 15 typically performs an inverter PWM control or the like by feedbacking a driving current of the hoisting machine 4.

Figure 2:
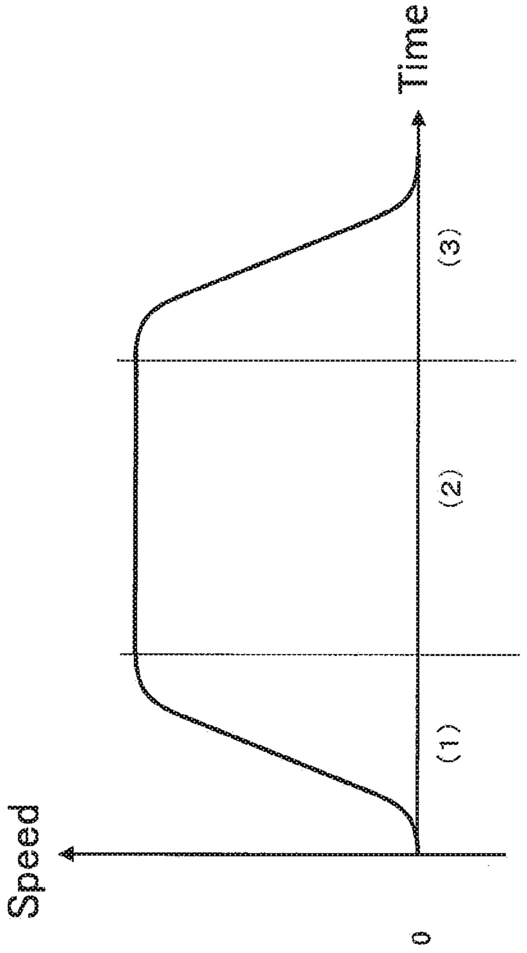
FIG. 2 is a graph for showing a base speed command at the time of a re-leveling operation in the first embodiment of the present invention.

FIG. 2 shows the base speed command which is generated by the re-leveling operation controller 12 at the time of the re-leveling operation. In FIG. 2, the vertical axis represents speed, and the horizontal axis represents time. The solid line indicates the base speed command at the time of the re-leveling operation. Further, the time interval (1) corresponds to an acceleration time, the time interval (2) corresponds to a constant speed time, and the time interval (3) corresponds to a deceleration time. The re-leveling operation controller 12 determines respective time allocations to the time interval (1), the time interval (2), and the time interval (3) based on the remaining distance to the designated stop floor calculated by the remaining-distance calculator 11.

The speed-command corrector 13 corrects the base speed command, which is generated by the re-leveling operation controller 12, based on the current height of the car 1 calculated by the car-height calculator 9, and generates the final speed command. More specifically, the speed-command corrector 13 corrects the base speed command so as to reduce its maximum speed as the height of the car 1 is lower, while the acceleration time and the deceleration time are unchanged.

Figure 3:
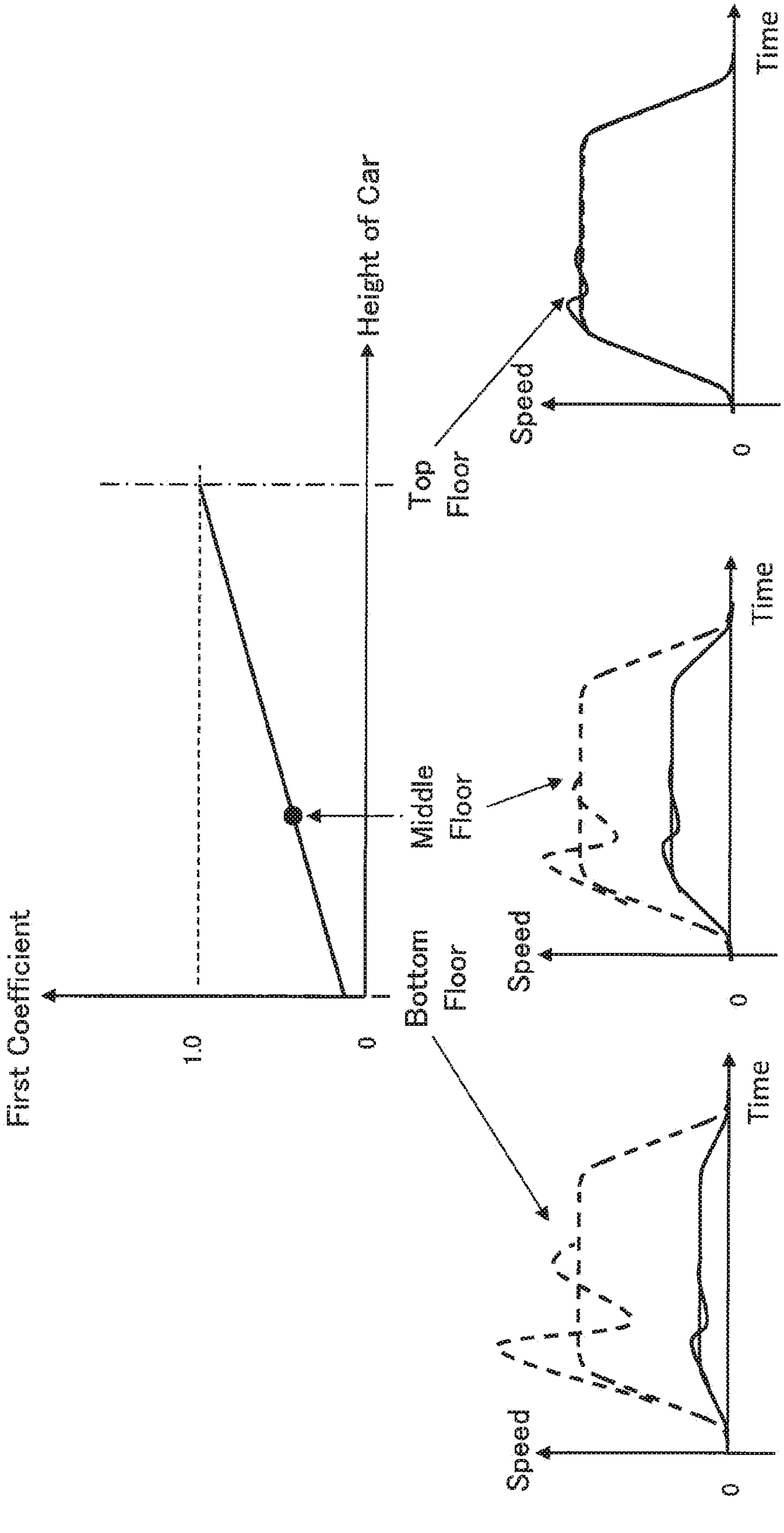
FIG. 3 is a graph for showing a method of correcting the base speed command based on a current height of a car in the first embodiment of the present invention.

FIG. 3 shows a method of correcting the base speed command in the first embodiment of the present invention. An upper side in FIG. 3 shows a relationship between the height of the car 1 and a first coefficient to be multiplied to the maximum speed of the base speed command. Here, when the maximum speed is changed, the base speeds at the acceleration time and the deceleration time are also multiplied by the first coefficient so that the speed command is prevented from being discontinuous.

In the first embodiment of the present invention, the value of the first coefficient at the top floor is set to be 1, and the value of the first coefficient at the bottom floor is set to be less than 1. Then, the values of the first coefficient at the middle floors between the top floor and the bottom floor are determined by a linear interpolation, based on the values of the first coefficient at the top floor and the bottom floor, with reference to the current height of the car 1.

The elevator can be considered as a mechanical system consists of the car 1, the hoisting rope 2, and the counterweight 3. An eigen-frequency, which causes expansion and contraction of the hoisting rope 2, varies depending on the length of the hoisting rope 2. That is, the eigen-frequency of the mechanical system varies depending on the height of the car 1. The first coefficient described above is determined such that a content amount of the eigen-frequency component of the mechanical system is removed from the speed command after multiplication of the first coefficient. As a result, the occurrence of vibrations of the car 1 at the acceleration time and the deceleration time by the re-leveling operation is suppressed.

A lower side in FIG. 3 shows the speed commands of the re-leveling operation and the actual speeds of the car 1 at the bottom floor, the middle floors, and the top floor. In each graph, the dotted line indicates a case in which the first coefficient is not multiplied (that is, base speed command), and the solid line indicates a case in which the first coefficient is multiplied. At the top floor, the eigen-frequency of the mechanical system is high, and the influence of the expansion and contraction of the hoisting rope 2 is small. Therefore, even when the value of the first coefficient is set to be 1, the vibrations of the car 1 do not occur at the acceleration time.

Meanwhile, at the bottom floor and the middle floors, the eigen-frequency of the mechanical system is low, and the influence of the expansion and contraction of the hoisting rope 2 is large. Therefore, when the first coefficient is not multiplied, the vibrations of the car 1 occur at the acceleration time. In contrast, when the first coefficient is multiplied, the eigen-frequency of the mechanical system is removed from the base speed command, and the occurrence of the vibrations of the car 1 at the acceleration time can be suppressed.

As described above, according to the elevator apparatus of the first embodiment of the present invention, the speed at the time of the re-leveling operation is corrected based on the current height of the car, and hence the occurrence of the vibrations of the car 1 can be suppressed. In particular, the speed at the time of the re-leveling operation is corrected so as to reduce its maximum speed as the current height of the car 1 is lower, while the acceleration time and the deceleration time are unchanged. As a result, the influence of the expansion and contraction of the hoisting rope 2, which increases at a lower floor, is eliminated, and landing accuracy at the time of the re-leveling operation is improved.

Second Embodiment

Next, description is made of an elevator apparatus according to a second embodiment of the present invention. However, a configuration and a base speed command at the time of the re-leveling operation of the second embodiment are the same as those of the first embodiment (FIG. 1 and FIG. 2), and thus the detailed descriptions thereof are omitted.

A speed-command corrector 13 in the second embodiment is similar to that of the first embodiment in correction of the base speed command based on the current height of the car 1. However, the speed-command corrector 13 corrects the base speed command so as to reduce its acceleration as the height of the car 1 is lower, while the maximum speed is unchanged.

Figure 4:
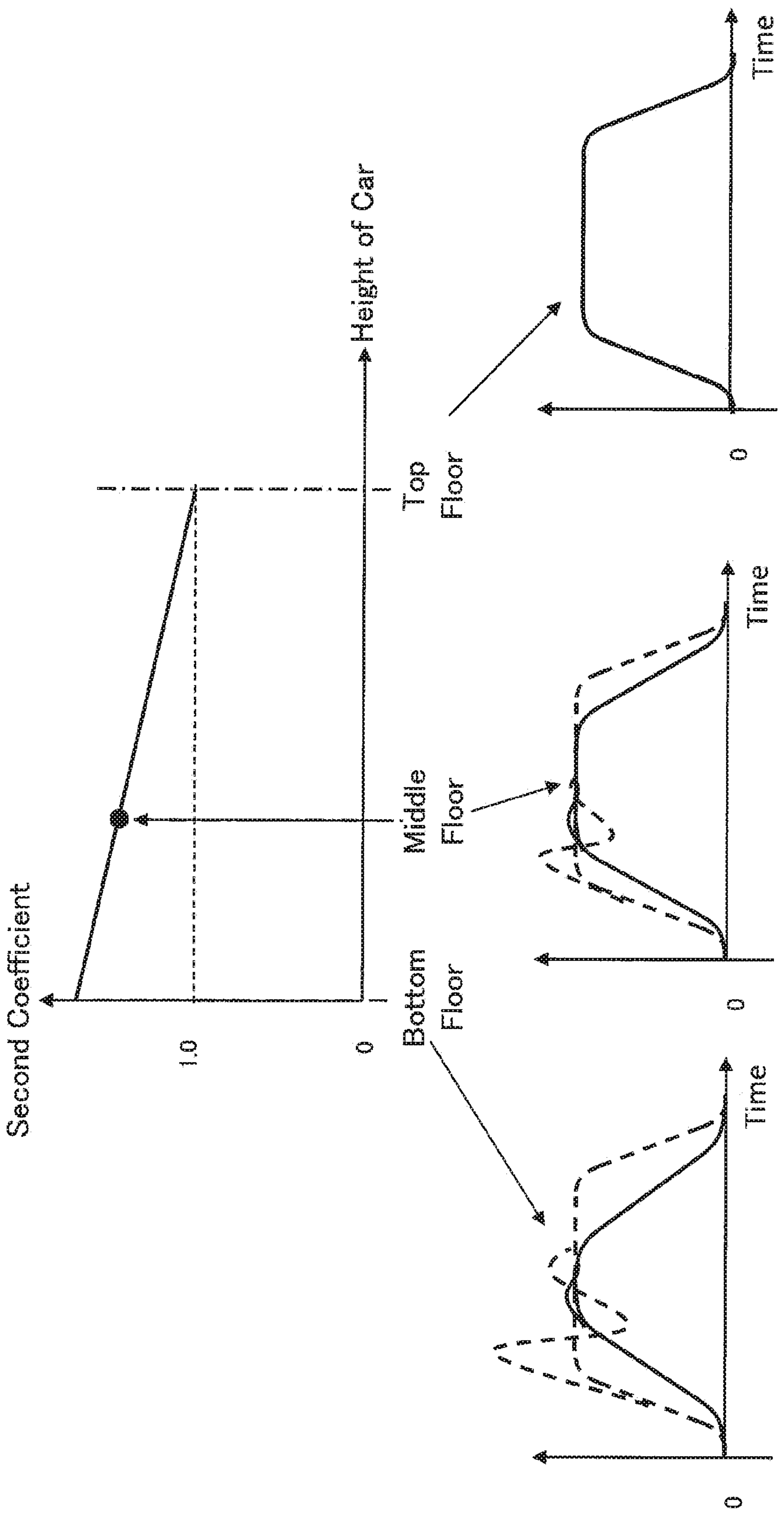
FIG. 4 is a graph for showing a method of correcting the base speed command based on a current height of the car in a second embodiment of the present invention.

FIG. 4 shows a method of correcting the base speed command according to the second embodiment of the present invention. A upper side in FIG. 4 shows a relationship between the height of the car 1 and a second coefficient to be multiplied to the acceleration time and the deceleration time of the base speed command.

In the second embodiment of the present invention, the value of the second coefficient at the top floor is set to be 1, and the value of the second coefficient at the bottom floor is set to be more than 1. Then, the values of the second coefficient at the middle floors between the top floor and the bottom floor are determined by a linear interpolation, based on the values of the second coefficient at the top floor and the bottom floor, with reference to the current height of the car 1.

The second coefficient is similarly determined such that a content amount of the eigen-frequency component of the mechanical system is removed from the speed command after multiplication of the second coefficient. As a result, the occurrence of vibrations of the car 1 at the acceleration time and the deceleration time by the re-leveling operation is suppressed.

A lower side in FIG. 4 shows the speed commands of the re-leveling operation and the actual speeds of the car 1 at the bottom floor, the middle floors, and the top floor. In each graph, the dotted line indicates a case in which the second coefficient is not multiplied (that is, base speed command), and the solid line indicates a case in which the second coefficient is multiplied. At the top floor, the eigne-frequency of the mechanical system is high, and the influence of the expansion and contraction of the hoisting rope 2 is small. Therefore, even the value of the second coefficient is set to be 1, the vibrations of the car 1 do not occur at the acceleration time.

Meanwhile, at the bottom floor and the middle floors, the eigen-frequency of the mechanical system is low, and the influence of the expansion and contraction of the hoisting rope 2 is large. Therefore, when the second coefficient is not multiplied, the vibrations of the car 1 occur at the acceleration time. In contrast, when the second coefficient is multiplied, the eigne-frequency of the mechanical system is removed from the base speed command, and the occurrence of the vibrations of the car 1 at the acceleration time can be suppressed.

As described above, according to the elevator apparatus of the second embodiment of the present invention, the speed at the time of the re-leveling operation is corrected so as to reduce its acceleration as the current height of the car 1 is higher, while the maximum speed is unchanged. As a result, the influence of the expansion and contraction of the hoisting rope, which increases at a lower floor, is eliminated, and a time required for the re-leveling operation is shortened.

The invention claimed is:

1. An elevator apparatus, comprising:

a hoisting rope having an expansion and contraction amount which varies depending on a height of a car, the elevator apparatus performing a re-leveling operation, wherein a correction is performed so that an absolute value of an acceleration at a time of the re-leveling operation is reduced as a current height of the car is lower such that lower floors have a lower absolute value of acceleration as compared to a highest floor during the re-leveling operation, wherein an absolute value of a maximum speed of the car is reduced as a height of the car is lower while the absolute value of the acceleration at the time of the re-leveling operation is reduced as the height of the car is lower without changing a time of the acceleration, and wherein the correction is performed by multiplying a coefficient, which varies with the current height of the car, with a speed command, the coefficient being determined such that a content amount of an eigen-frequency of the elevator apparatus is removed from the speed command after multiplication of the coefficient with the speed command, wherein the eigen-frequency varies depending on a length of the hoisting rope and corresponds to expansion and contraction of the hoisting rope; and a value of the coefficient is less than 1 at a bottom floor and values of the coefficient at middle floors between the top floor and bottom floor are determined by linear interpolation.

2. The elevator apparatus according to claim 1, wherein:

while the absolute value of the acceleration at the time of the re-leveling operation is reduced, an acceleration time of the car is unchanged.

3. The elevator apparatus according to claim 1, wherein:

while the absolute value of the acceleration at the time of the re-leveling operation is reduced, a deceleration time of the car is unchanged.

4. The elevator apparatus according to claim 1, wherein:

while the absolute value of the acceleration at the time of the re-leveling operation is reduced, an acceleration time of the car is unchanged and a deceleration time of the car is unchanged.

5. An elevator apparatus, comprising:

a hoisting rope having an expansion and contraction amount which varies depending on a height of a car;

circuitry configured to perform a re-leveling operation; and circuitry configured to perform a correction so that an absolute value of an acceleration at a time of the re-leveling operation is reduced as a current height of the car is lower such that lower floors have a lower absolute value of acceleration as compared to a highest floor during the re-leveling operation, wherein an absolute value of a maximum speed of the car is reduced as a height of the car is lower while the absolute value of the acceleration at the time of the re-leveling operation is reduced as the height of the car is lower without changing a time of the acceleration, and wherein the circuitry configured to perform the correction performs the correction by multiplying a coefficient, which varies with the current height of the car, with a speed command, the coefficient being determined such that a content amount of an eigen-frequency of the elevator apparatus is removed from the speed command after multiplication of the coefficient with the speed command, wherein the eigen-frequency varies depending on a length of the hoisting rope and corresponds to expansion and contraction of the hoisting rope; and a value of the coefficient is less than 1 at a bottom floor and values of the coefficient at middle floors between the top floor and bottom floor are determined by linear interpolation.

6. The elevator apparatus according to claim 5, wherein: while the absolute value of the acceleration at the time of the re-leveling operation is reduced, an acceleration time of the car is unchanged.

7. The elevator apparatus according to claim 5, wherein: while the absolute value of the acceleration at the time of the re-leveling operation is reduced, a deceleration time of the car is unchanged.

8. The elevator apparatus according to claim 5, wherein: while the absolute value of the acceleration at the time of the re-leveling operation is reduced, an acceleration time of the car is unchanged and a deceleration time of the car is unchanged.

* * * * *